Feb. 9, 1971  SHIGEO KAWAMURA ET AL  3,562,386

WAXLIKE SOLID MATERIALS

Filed March 14, 1966

Shigeo Kawamura,
Keishiro Shirakama and
Koji Tomuro  INVENTORS

BY Wenderoth,
Lind and Ponack, Attorneys

United States Patent Office 3,562,386
Patented Feb. 9, 1971

3,562,386
WAXLIKE SOLID MATERIALS
Shigeo Kawamura, Urawa, and Keishiro Shirahama and Koji Tomuro, Tokyo, Japan, assignors to Yamanouchi Pharmaceutical Co., Ltd., Tokyo, Japan
Filed Mar. 14, 1966, Ser. No. 534,150
Claims priority, application Japan, July 5, 1965, 40/39,967
Int. Cl. A61k 27/00, 9/02
U.S. Cl. 424—80
17 Claims

ABSTRACT OF THE DISCLOSURE

A solid low melting-point, wax-like, single-phase material is obtained by dissolving one part by weight of sorbitol into a total of about 0.3 to 4 parts by weight of glycerine and/or an alkylene diol having two to six carbon atoms under mild heating and then permitting solidification. It is useful as a suppository and may carry medicaments.

---

The present invention relates to a new waxlike solid material of single-phase, which consists of sorbitol and one or more of hydroxy compounds selected from the group consisting of glycerine and low alkylenediols having from two to six carbon atoms.

Further, the invention relates to a new waxlike solid material which comprises a waxlike solid material of single-phase consisting of sorbitol and one or more of hydroxy compounds selected from the group consisting of glycerine and low alkylenediols having from two to six carbon atoms, and one or more of those substances admixed therewith which modify the rheological properties such as voscosity, elasticity, etc. of the latter material.

The waxlike solid materials of this invention are suitable for suppository bases.

The quality of a suppository depends on the properties of the bases employed for the preparation of the same. It is essential for the suppository bases that they do not irritate the mucous membrane, that they are stably shaped at room temperatures and can easily be interposed into the coeloma, and that they are, after the interposition into the coeloma, sensitively softened and melted under the affection of the body temperature and the body fluid to release the medicaments contained in the suppository.

These days, various types of materials, i.e. the oleaginous type such as cacao butter, lanolin, etc., the emulsion type such as an oleaginous substance admixed with an emulsifying agent or a surface-active agent, and the water-soluble type such as Carbowax, etc., are generally used as suppository bases. All bases consisting of these materials, however, have a common defect that they are not sufficiently sensitive to the affection of the body temperature and the body fluid in the coeloma.

More precisely, some oleaginous bases which are easy to melt with the body temperature lack in the shape-stability and can hardly be interposed into the coeloma, especially in summer when the room temperature is close to the body temperature. On the contrary, other oleaginous bases which are shape-stable even in summer are difficult to melt with the body temperature. In order to overcome such defect of the conventional oleaginous bases, it has been desired to find out or develop new oleaginous bases having a narrow softening temperature range. However, this problem in the field of oleaginous bases has not fully been dissolved up to date, even with the emulsion type bases consisting of an oleaginous material admixed with an emulsifying agent.

As regards the water-soluble bases, it is not essentially requested that they have so narrow softening temperature range as the oleaginous ones, since the softening and the melting of the water-soluble bases are affected not only by the temperature but also by the moisture. appearance of water-soluble bases which show an acute elevation of the susceptibility to the softening and melting in correspondence to a slight increase of the moisture contents, has been hitherto expected. Nevertheless, the previously known water-soluble bases are not satisfactory with respect to this point and have a defect that they need a long time for the wetting and melting after the interposition into the coeloma.

Thus, it is desired in the art to get a new suppository base which is storage-stable and rapidly softened and melted under the affection of the body temperature and the body fluid.

Now, it has been found that a new waxlike solid material of single-phase having the desired properties for the suppository base can be obtained by admixing sorbitol with one or more of hydroxy compounds selected from the group consisting of glycerine and low alkylenediols having from two to six carbon atoms.

Further, it has been found that a new waxlike solid material having the desired properties for the suppository base can be obtained by admixing sorbitol with one or more of hydroxy compounds selected from the group consisting of glycerine and low alkylenediols having from two to six carbon atoms and one or more of those substances which modify the rheological properties such as viscosity, elasticity, etc. of the material.

As the alkylenediols which may be used in accordance with this invention, there can be mentioned those having from two to six carbon atoms, such as ethanediol, propanediol, butanediol, pentanediol and hexanediol.

As examples of the substances which may be admixed with the single-phase solid materials of this invention in order to modify the rheological properties thereof, there can be mentioned water, polyoxyalkylenes such as polyethylene glycol, polypropylene glycol, polyoxyethylene alkyl-ether, polyoxyethylene alkylaryl-ether, polyoxyethylene alkyl-ester, polyoxyethylene sorbitan alkyl-ester and a block polymer of polyethylene glycol and polypropylene glycol, polyvinyl pyrrolidone, cellulose acetate, cellulose acetate phthalate, methyl cellulose and its derivatives, and ethyl cellulose and its derivatives.

The single-phase solid materials of this invention are prepared by admixing sorbitol with one or more of hydroxy compounds in an amount ratio of about 1:0.3–4, preferably in an amount ratio of about 1:0.5–2.

The amount of the substances to be added to the single-phase solid materials in order to modify the rheological properties thereof, may be equivalent (in weight) to or less than the amount of the single-phase solid materials.

The rheological properties of the waxlike solid materials of this invention may be adjusted as desired, by selecting the components and the amount ratio thereof.

The waxlike solid materials of this invention have a softening temperature range from about 40° C. to about 70° C. These materials are shape-stable under the atmosphere condition even in summer. When they are interposed into the coeloma, however, they are rapidly softened and liquefied under the affection of the body fluid to release the medicaments incorporated therein. In the case of the waxlike solid materials having lower softening temperature, the softening is much more accelerated by the body temperature. Thus, the waxlike solid materials of this invention may be used as the suppository bases, without taking account of their specific softening temperatures under the affection of temperature only.

The waxlike solid materials of this invention comprising glycerine as the hydroxy compound component may be used, as they stand, as purgatives, more particularly in the form of glycerine suppositories.

The waxlike solid materials which comprise the single-phase solid materials and the substances admixed therewith to modify the rheological properties of the latter, may be used as suppository bases depending on their properties.

The waxlike solid materials of this invention are semi-transparent, or pale colored, single-phase solid materials.

Even after the storage over six months at 45° C., any change of the quality could not be observed on the waxlike solid materials of this invention under metal-packed condition. As regards the previously known suppository bases, however, it was impossible to store them in good condition for six months at 45° C.

The determination of the softening temperature of the single-phase solid materials of this invention was effected in the course of this invention according to an original method as described hereinafter. The softening temperatures of the single-phase solid materials of this invention were in a range from about 40° C. to about 70° C., as determined according to the original method.

FIGS. 1 and 2 show the X-ray diffraction patterns of the waxlike solid materials of this invention. The determination was carried out under the following conditions:

Target: Cu
Filter: Ni
Voltage: 30 kv.
Current: 20 ma.
Count full scale: 800 c.p.s.
Time constant: 2 sec.
Scanning speed: 1/min.
Chart speed: 20 mm./min.
Divergence slit: ½
Receiving angle: 0.30 mm.
Glancing angle: 5°
Angle range: 10°–30°

The waxlike solid materials of this invention are prepared by dissolving one part by weight of sorbitol into a total of about 0.3–4 parts by weight of one or more of hydroxy compounds (selected from the group consisting of glycerine and low alkylenediols having from two to six carbon atoms) under mild heating and allowing the product obtained to stand at room temperature for 3–12 hours to solidify the same. The solidification of the product may be accelerated by stirring the same or by maintaining it below the room temperature.

If desired, any medicaments for the final suppository may be incorporated into the waxlike solid material on preparing the latter, whereby a suppository preparation containing the medicaments is obtained in one procedure.

The present invention is further illustrated by the following examples. It is to be understood, however, that these examples are not intended to be a limitation on the invention.

In these examples, the softening temperatures are those at which 0.5 g. of a sample material placed in a test tube having a length of 100 mm. and a diameter of 8 mm. begins to flow. The "melting time A" shows a time necessary for the melting of a sample material in 50 ml. of distilled water at 37° C. and the "melting time B" shows that under gentle shaking as determined with the aid of "USP XVII Tablet Disintegration Apparatus."

EXAMPLE 1

Three parts by weight of sorbitol were dissolved into 2 parts by weight of 1,2-propanediol under mild heating, and allowed to stand at 25° C. After 8 hours, the product became a solid having a softening temperature of 44–50° C. A ball weighing 3.5 g. of the solid material indicated the melting time A of 25–30 minutes and the melting time B of 8 minutes.

The following Table I shows the results obtained by the same procedure as described above in Example 1.

TABLE I

| Example No. | Starting materials | Amount ratio (by weight) | Solidification Temp., °C. | Time requested, hours | Softening temperature, °C. | Melting time, minutes A | B |
|---|---|---|---|---|---|---|---|
| 2 | Sorbitol / 1,4-butanediol | 1 / 2 | 25 | 10 | 43–49 | 20–26 | 9 |
| 3 | Sorbitol / 1,4-butanediol | 3 / 4 | 5 | 4 | 44–51 | 24–26 | 10 |
| 4 | Sorbitol / 1,4-butanediol | 1 / 1 | 5 | 3 | 46–52 | 27–36 | 9 |
| 5 | Sorbitol / Glycerine | 2 / 3 | 5 | 4 | 45–53 | 18–23 | 8 |
| 6 | Sorbitol / 1,2-propanediol / Glycerine | 1 / 1 / 1 | 5 | 4 | 42–47 | 20–24 | 9 |
| 7 | Sorbitol / 2,5-hexanediol | 1 / 2 | 25 | 8 | 45–50 | 23–26 | 9 |

Figure 1:
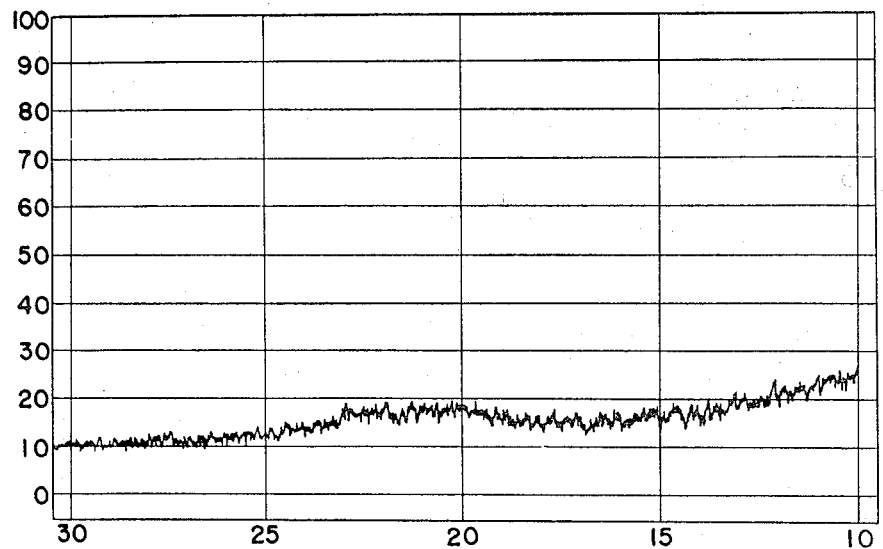
FIG. 1 shows the X-ray diffraction pattern of a single-phase solid material of this invention prepared from sorbitol and 1,2-propanediol in the amount ratio by weight of 1:2.

From the fact that the sharp peak indicating the presence of sorbitol cannot be observed in FIG. 1, it is confirmed that the waxlike solid material of this invention is not a single mixture of sorbitol and a hydroxy compound—1,2-propanediol—but a kind of solid solution.

EXAMPLE 8

Three grams of phenol and 11 g. of sorbitol were dissolved into 11 g. of 1,4-butanediol while stirring and mild heating. The product was then cast in stick-shaped moulds (designed for the preparation of suppositories for anal use) and worked up into 10 pieces of suppositories. The time requested for the solidification of the suppositories was 6 hours at 25° C. The softening temperature of the suppositories was 44–52° C. and the melting time A thereof was 15–18 min.

EXAMPLE 9

One and one half grams of chloramphenicol and 14.1 g. of sorbitol were dissolved into 9.4 g. of 1,2-propanediol while stirring and mild heating. The product was then cast in stick-shaped moulds (designed for the preparation of suppositories for anal use) and worked up into 10 pieces of suppositories. The time requested for the solidification of the suppositories was 3 hours at 5° C. The softening temperature of the suppositories was 43–49° C., and the melting time A thereof was 21–24 min.

EXAMPLE 10

*Extractum scopoliae* weighing 0.6 g. and 15 g. of sorbitol were dissolved into 10 g. of 1,2-ethanediol while stirring and mild heating. The product was then cast in stick-shaped moulds and worked up into 10 pieces of suppositories. The time requested for the solidification of the suppositories was 4 hours at 5° C. The softening temperature of the suppositories was 40–46° C. and the melting time A thereof was 14–22 min.

EXAMPLE 11

Twenty-five grams of sorbitol were dissolved into 20 g. of 1,2-propanediol under mild heating and, to the product thus obtained, was added 0.5 g. of hydroxypropoxycellulose. Upon standing for 5 hours at 3–5° C., a white solid material resulted. The softening temperature of the white solid material was 43–49° C. A ball weighing 3.5 g. prepared from the white solid material indicated the melting time A of 20–24 minutes and the melting time B of 8 minutes.

EXAMPLE 12

Twenty-five grams of sorbitol were dissolved into 25 g. of 1,2-ethanediol under mild heating and, to the product thus obtained, was added 50 g. of a block polymer of polyethylene glycol and polypropylene glycol [Pluronic-L62 (Wyandotte Chemicals Corp.)]. Upon stirring for 20 minutes at 10° C., a white soft solid material resulted. The softening temperature of the solid material was 42–50° C.

The following Table II shows the results obtained by the same procedure as described above in Example 12.

a single-phase product by mild heating of the mixture on a water-bath (at a temperature within the range from 40 to 100° C.), followed by solidification into a single-phase solid material.

It is to be understood that the invention is not to be limited to the exact details of the above-description. The invention is to be limited only by the scope of the appended claims.

What is claimed is:

1. A waxlike solid material of single-phase, which consists of one part by weight of sorbitol and a total of about 0.3–4 parts by weight of one or more hydroxy compounds selected from the group consisting of glycerine and lower alkylenediols having from two to six carbon atoms.

2. A waxlike solid material of single-phase as claimed in claim 1, wherein the hydroxy compound is 1,2-ethanediol.

3. A waxlike solid material of single-phase as claimed in claim 1, wherein the hydroxy compound is 1,2-propanediol.

4. A waxlike solid material of single-phase as claimed in claim 1, wherein the hydroxy compound is 1,4-butanediol.

5. A waxlike solid material of single-phase as claimed in claim 1, wherein the hydroxy compound is glycerine.

6. A waxlike solid material of single-phase as claimed in claim 1, wherein the hydroxy compounds are 1,2-propanediol and glycerine.

7. A waxlike solid material of single-phase as claimed in claim 1, wherein the hydroxy compound is 2,5-hexanediol.

8. The solid waxlike single-phase material of claim 1, said material melting at about 40° C. to about 70° C. and being useful as a suppository.

9. A waxlike solid material useful as a suppository base which comprises the waxlike solid material of single-phase as claimed in claim 1 and, admixed therewith, in an amount up to the weight of the single-phase solid material

TABLE II

| Starting materials | Amount ratio (by weight) | Solidification | | Softening temp., °C. | Properties |
| --- | --- | --- | --- | --- | --- |
| | | Temp., °C. | Time requested, hour | | |
| Example No.: | | | | | |
| 13 — Sorbitol | 2 | 10 | 1 | | White paste. |
| 1,2-propanediol | 3 | | | | |
| Polypropylene glycol 2,000 | 5 | | | | |
| 14 — Sorbitol | 2 | 10 | 1 | 36–40 | White solid. |
| 1,2-propanediol | 3 | | | | |
| Polypropylene glycol 2,000 | 5 | | | | |
| Polyvinyl pyrrolidone | 0.2 | | | | |
| 15 — Sorbitol | 1 | 11 | 0.5 | 55–60 | Do. |
| 1,4-butanediol | 1 | | | | |
| Polyoxyethylene dodecylether | 2 | | | | |
| 16 — Sorbitol | 1 | 6 | 0.5 | 45–53 | White, hard and waxlike solid. |
| Glycerine | 1 | | | | |
| Polyethylene glycol 400 | 2 | | | | |

EXAMPLE 17

Three parts by weight of sorbitol were admixed with one part by weight of glycerine, and the admixture was melted by mild heating. Then, the melt was cast in stick-shaped moulds (designed for the preparation of suppositories for anal use) to form purgative suppositories. The time requested for the solidification of the suppositories was 3 hours at 5° C. The softening temperature of the suppositories was 41–45° C. and the melting time A thereof was 18–24 minutes.

Figure 2:
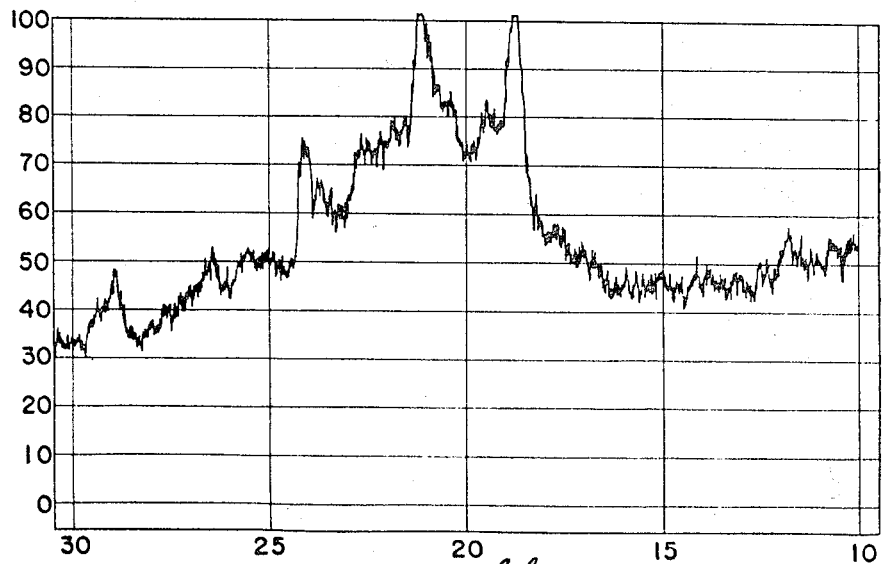
FIG. 2 shows the X-ray diffraction pattern of a mixture obtained by merely mixing sorbitol and 1,2-propanediol in the same amount ratio by weight of 1:2. The sharp peak in the pattern indicates the diffraction caused by sorbitol crystal.

With reference to the showings in FIGS. 1 and 2, it will be understood that the mixture, of which FIG. 2 shows the diffraction pattern, is a simple mechanical mixture, the ingredients of which have merely been mixed together at room temperature (about 20° to about 30° C.) so that a two-phase mixture results. In sharp contrast, the single-phase solid material of this invention results from mixing the ingredients and then achieving dissolution into a substance selected from the group consisting of hydroxypropoxycellulose, polypropylene glycol 2000, polyvinyl pyrrolidone, cellulose acetate, cellulose acetate phthalate, methyl cellulose, ethyl celluose, and polyethylene glycol 400.

10. The solid waxlike material of claim 9, wherein the admixed substance is polypropylene glycol 2000.

11. The solid waxlike material of claim 9 wherein the admixed substance is polyethylene glycol 400.

12. The solid waxlike material of claim 9 wherein the admixed substance is polyvinyl pyrrolidone.

13. The solid waxlike material of claim 9 wherein the admixed substance is hydroxypropoxycellulose.

14. A suppository which comprises a pharmaceutically effective amount of a medicament selected from the group consisting of phenol, chloramphenicol and *extractum scopoliae* and a waxlike solid material of single-phase consisting of one part by weight of sorbitol and a total of about 0.3-4 parts by weight of one or more hydroxy compounds selected from the group consisting of glycerine and lower alkylenedinols having from two to six carbon atoms.

15. A suppository as claimed in claim 14, wherein the hydroxy compound is 1,2-ethanediol.

16. A suppository as claimed in claim 14, wherein the hydroxy compound is 1,2-propanediol.

17. A suppository as claimed in claim 14, wherein the hydroxy compound is 1,4-butanediol.

References Cited

UNITED STATES PATENTS

| | | | |
|---|---|---|---|
| 2,484,035 | 10/1949 | Johnson | 167—58 |
| 2,623,839 | 12/1952 | Taub | 167—64X |
| 2,623,841 | 12/1952 | Taub | 167—64X |
| 2,830,929 | 4/1958 | Fries et al. | 167—22X |
| 2,854,378 | 9/1958 | Buckwalter | 167—64 |
| 2,895,880 | 7/1959 | Rosenthal | 167—64UX |
| 3,000,764 | 9/1961 | Drucker | 167—22UX |
| 3,012,039 | 12/1961 | Morley | 167—64X |
| 3,197,369 | 7/1965 | Widmann et al. | 167—64 |
| 3,205,135 | 9/1965 | Tybring | 167—64X |
| 3,256,295 | 6/1966 | Karmas | 167—64X |

FOREIGN PATENTS

| | | | |
|---|---|---|---|
| 519,153 | 12/1955 | Canada | 167—22 |

OTHER REFERENCES

Atlas Sorbitol, 1947, p. 13, Atlas Powder Company.

Atlas Surfactants and Sorbitol, 1960, pp. 23–25 and 31, Atlas Powder Company.

Sagarin, Cosmetics Science and Technology, 1957, p. 1007.

Lesser, The Drug and Cosmetic Industry, April 1944, vol. 54, No. 4, pp. 403, 404, 460, 461 and 480.

ALBERT T. MEYERS, Primary Examiner

D. R. ORE, Assistant Examiner

U.S. Cl. X.R.

424—195, 324, 346, 358